(12) United States Patent
Bronicki

(10) Patent No.: US 7,320,221 B2
(45) Date of Patent: Jan. 22, 2008

(54) METHOD AND APPARATUS FOR USING GEOTHERMAL ENERGY FOR THE PRODUCTION OF POWER

(75) Inventor: Lucien Y. Bronicki, Yavne (IL)

(73) Assignee: Oramt Technologies Inc., Reno, NV (US)

( * ) Notice: Subject to any disclaimer, the term of this patent is extended or adjusted under 35 U.S.C. 154(b) by 279 days.

(21) Appl. No.: 10/910,613

(22) Filed: Aug. 4, 2004

(65) Prior Publication Data

US 2006/0026961 A1     Feb. 9, 2006

(51) Int. Cl.
*F03G 7/00*     (2006.01)

(52) U.S. Cl. .................... 60/641.2; 60/641.4

(58) Field of Classification Search ........... 60/641.2, 60/641.3, 641.4, 641.5
See application file for complete search history.

(56) References Cited

U.S. PATENT DOCUMENTS

| | | | | |
|---|---|---|---|---|
| 3,318,145 A * | 5/1967 | Lynn et al. ............... | 73/152.53 |
| 3,863,709 A * | 2/1975 | Fitch ........................ | 165/45 |
| 4,112,745 A * | 9/1978 | McCabe et al. .......... | 60/641.2 |
| 4,223,729 A * | 9/1980 | Foster ....................... | 166/271 |
| 4,344,485 A * | 8/1982 | Butler ........................ | 166/271 |
| 4,578,953 A | 4/1986 | Krieger et al. | |
| 4,700,543 A | 10/1987 | Krieger et al. | |
| 5,240,687 A * | 8/1993 | Gallup et al. ............. | 423/42 |
| 5,531,073 A | 7/1996 | Bronicki et al. | |
| 5,598,706 A | 2/1997 | Bronicki et al. | |
| 5,661,977 A * | 9/1997 | Shnell ...................... | 60/641.2 |
| 6,186,232 B1 * | 2/2001 | Isaacs et al. ............. | 166/272.3 |
| 6,318,464 B1 * | 11/2001 | Mokrys ..................... | 166/252.1 |

OTHER PUBLICATIONS

D. J. Ryley, et al., "Drilling for geothermal resources", Sourcebook on the production of Electricity from Geothermal Energy, Brown University, USA, DOE, Mar. 1980, pp. 136-155.
John H. Altseimer, "Geothermal Well Technology and Potential Applications of Subterrene Devices-A Status Review", pp. 1453-1470.
D. J. Ryley, "Analysis of the Flow in the Reservoir-Well System", Sourcebook on the production of Electricity from Geothermal Energy, Brown University, USA, DOE, Mar. 1980, pp. 172-211.

(Continued)

*Primary Examiner*—Hoang Nguyen
(74) *Attorney, Agent, or Firm*—Oblon, Spivak, McClelland, Maier & Neustadt, P.C.

(57) ABSTRACT

An apparatus and method for enhancing the flow of geothermal fluid from at least one injection well to at least one production well, which comprises a first horizontal geothermal well, which is used as the injection well, and into which water is injected; a second horizontal, geothermal well, which is used s the production well and from which geothermal fluid issues, wherein the second, horizontal, production, geothermal well is substantially horizontally and vertically spaced from the first, horizontal, injection, geothermal well and located at a shallower depth than the first, horizontal, injection, geothermal well; and the apparatus form producing a pressure difference between the first horizontal, injection well and the second horizontal, production well and utilizing the water density difference induced by the temperature difference. Preferably, binary geothermal power plants or combined cycle geothermal power plants can be used to produce power from geothermal fluid recovered from the production well.

38 Claims, 11 Drawing Sheets

OTHER PUBLICATIONS

Emmanuel Jacquot, "Description of the Geothermal HDR Site of Soultz-Sous-Forets (Bas-Rhin, France) Based on Data Collected During Previous Stimulation and Circulation Experiments for a Modelling Purpose", Draft Proceedings, 4th Int. HDR Forum, Sep. 28-30, 1998, 10 pages.

K. Katagiri, "Effect of Slotted Liner Casing in Geothermal Bores", Geothermics, Special Issue 2, U.N. Symposium on the Development and Utilization of Geothermal Resources, Pisa 1970, vol. 2, part 2, pp. 1497-1501.

James N. Albright, et al., "Microhole Drilling and Instrumentation", Draft Proceedings, 4th Int. HDR Forum, Sep. 28-30, 1998, 5 pages.

Gregory J. Nunz, "The Xerolithic Geothermal ("Hot Dry Rock") Energy Resource of the United States: an Update", Los Alamos, National Laboratory, LA-12606-MS, UC-920, Jul. 1993, 3 cover pages and pp. 1-31.

"Hot Dry Rock Energy", Hot Dry Rock Geothermal Development Program, LA-12903-PR, Progress Report, UC-1241, Mar. 1995, pp. 7-39.

Omar Sigurosson, et al., "Reinjection Strategy for Geothermal Systems", 1995, pp. 1967-1971.

A. C. Gringarten, et al., "Applied Pressure Analysis for Fractured Wells", Journal of Petroleum Technolgy, Jul. 1975, pp. 887-892.

D. w. Dareing, "State-of-the-Art of Drilling Thrusters", Category UC-66C, Jan. 1980.

* cited by examiner

HOT DRY ROCK (HDR)

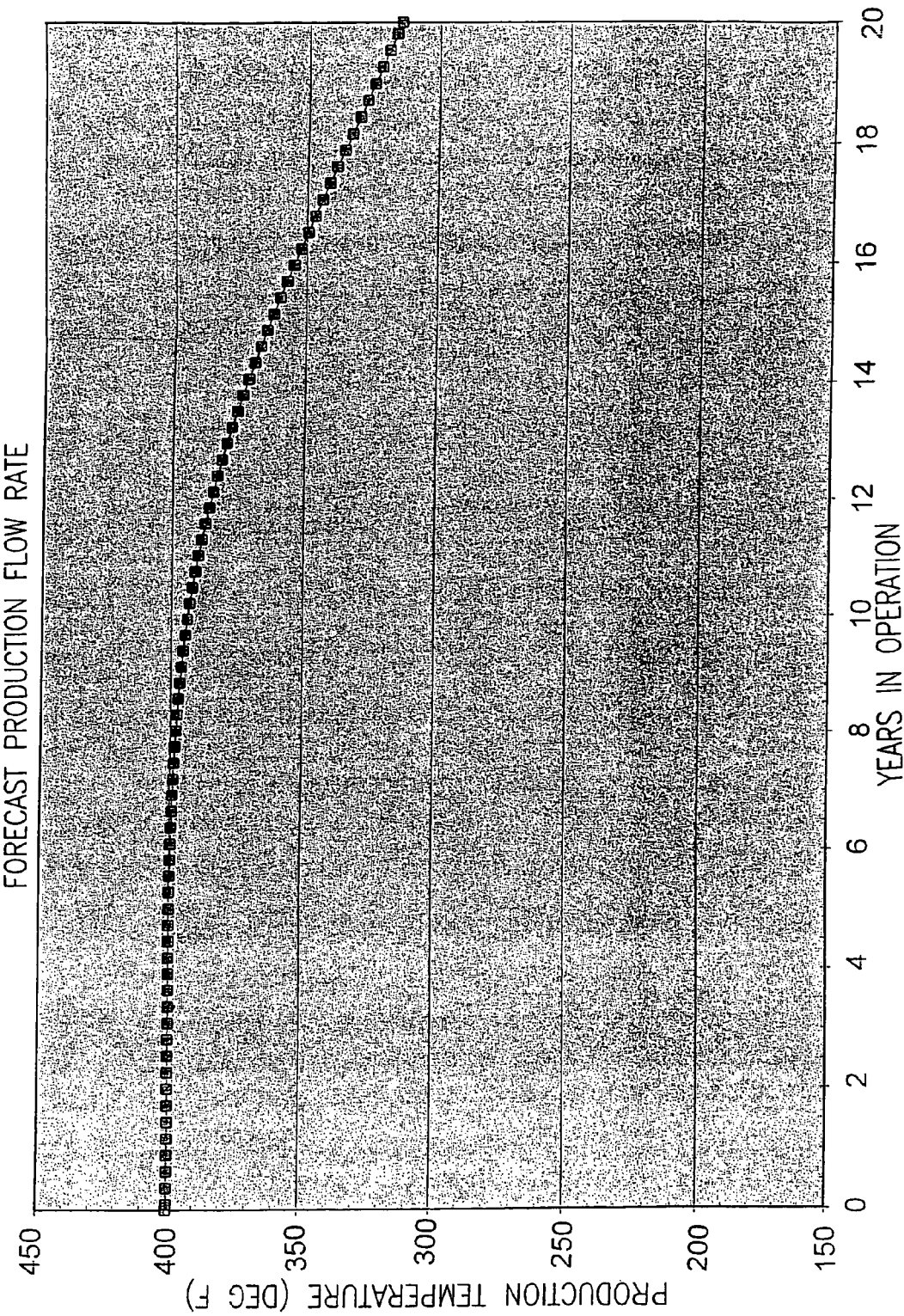

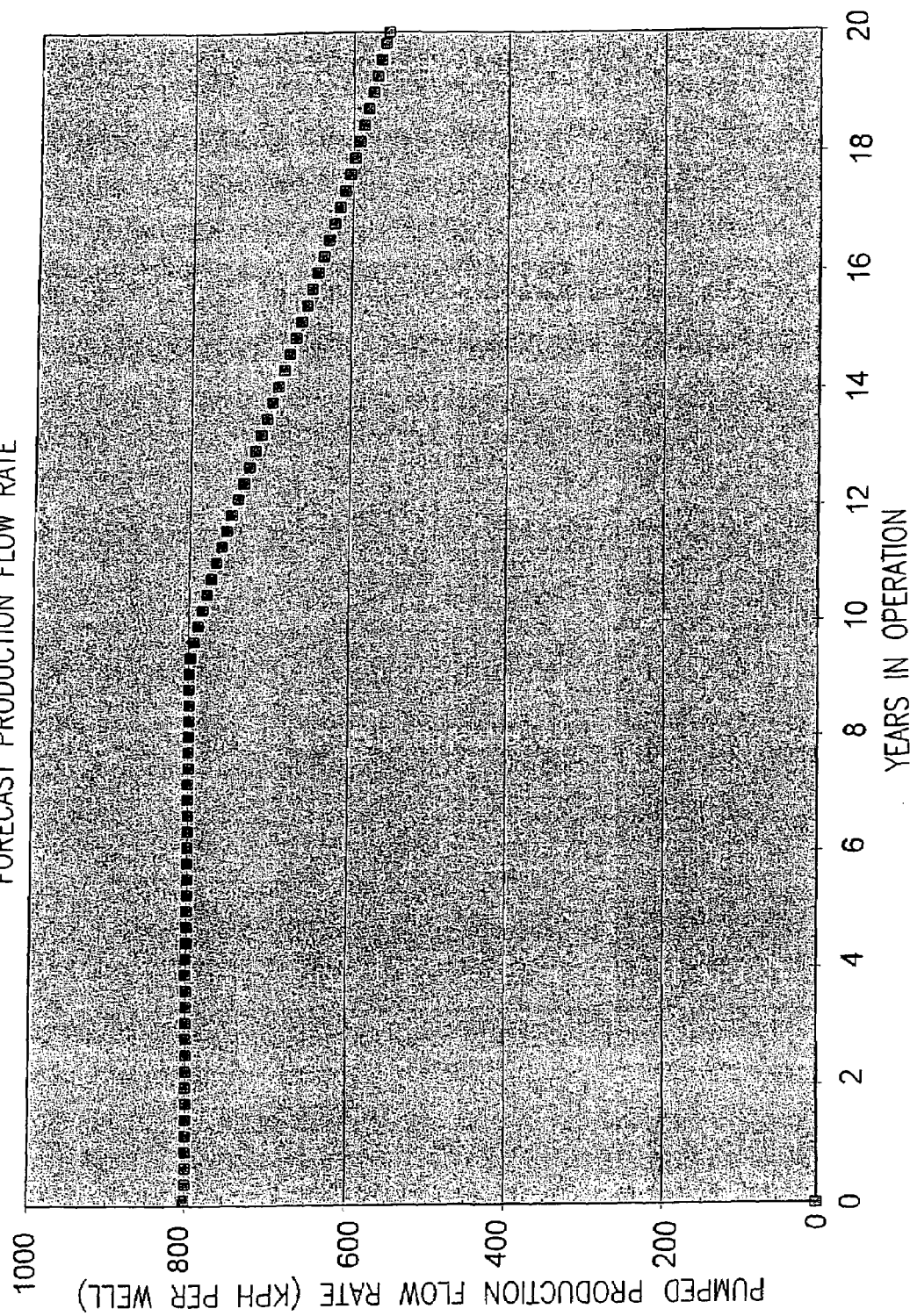

METHOD AND APPARATUS FOR USING GEOTHERMAL ENERGY FOR THE PRODUCTION OF POWER

FIELD OF THE INVENTION

The present invention relates to method and apparatus for the use of geothermal energy for the production of power, more specifically to method and apparatus for enhancing the flow of geothermal fluid from an injection well to a production well (or wells), from which it is conveyed to a power plant or to a heat exchanger in order to use its heat to produce power or for other purposes. This applies for both configurations of such a flow: the "classical" water dominated reservoir, the Enhanced Geothermal System (EGS) as well as the Hot Dry Rock (HDR) or Hot Fractured Rock (HFR) artificially stimulated reservoir.

BACKGROUND OF THE INVENTION

Geothermal energy recovery systems, which apply geothermal energy to the production of power, are the object of a considerable amount of attention in the prior art (DiPippo, R. et al., Brown University, U.S.A., DOE, March 1980). While commercial production of geothermal fluids (e.g. for power production) out of a "classical" steam or water dominated reservoirs is pretty well at hand, such production from Hot Dry Rock (HDR) (or Hot Fractured Rock HFR)) or even from reservoirs with low permeability or insufficient water recharge by Enhanced (or Engineered) Geothermal Systems (EGS) is essentially in the research and development stage, due to many problems in their actual industrial application, including difficulties in sustaining circulation of fluids at a high enough rate at reasonable pressure and losses to the surroundings. Nevertheless, research and development of such systems are being pursed intensively since a large amount of energy is available in such low permeability, semi-dry or dry geothermal reservoirs (Jacquot, 1998).

In the prior art, geothermal energy recovery systems typical comprise production as well as injection wells, which are connected by a permeable geological layer or fractures. Re-injection of spent geothermal fluids has been stated as beneficial for management of geothermal resources (Sigurosson et al, Florence 1995, pp. 1967). Geothermal wells (production and injection) are built drilled vertically or at an angle slightly deviated from the vertical.

When using a vertical geothermal well for producing, viz. extracting, geothermal fluid from the underground, different geological layers having various levels of permeability are traversed. The production location in said vertical geothermal wells are made at the depth where the temperature is sufficiently high and optimum extraction of the geothermal fluid (water, steam or water and steam mixture) has been established using the slotted liner or open hole [Katagiri, 1970]. The produced fluid is typically a mixture of water and steam, and in the type of plants that is most common in the present art, the so-called "steam" plants, the fluid has a temperature higher than about 360° F. The steam is produced by flashing in the reservoir or in a surface flash tank. The wells may be artesian wells, i.e. self-flowing wells wherein the pressure at the bottom opening exceeds the accompanying hydrostatic pressure of the overlying fluid column in the well pipe or wherein there is a phase change within the well, and consequently geothermal fluid flows out at the wellhead. In the case of water dominated resources, a pump may be used to promote its flow to the surface in the absence of artesian action, or to increase the flow rate above that due to artesian action, or in order to suppress flashing within the well bore (Dipippo, R. et al., Brown University, U.S.A., DOE, March 1980 pp. 172-210).

On the other hand, re-injection wells are used to do away with spent fluids at the geothermal power plants like separated brine at the well heads (geothermal water being also called "brine" because of its mineral content), or blow-down from a cooling tower associated with a water-cooled condenser of a geothermal power plant. This is in addition to the natural replenishment of the geothermal resource mostly by meteoric water (e.g. from a rain source).

In the case of air-cooled binary power plants, viz. plants in which the extracted geothermal fluid does not directly generate power but transfers most of its heat to a working fluid (generally organic), essentially all of the geothermal liquid is re-injected into re-injection wells thus avoiding the depletion of the aquifer. The beat of the geothermal fluid, or a substantial part of it, is recovered by heat exchange with a working fluid, which is used in the production of energy in ways and by apparatus known in the art (see e.g. U.S. Pat. No. 5,598,706). The depleted geothermal fluid, viz. the geothermal fluid from which heat has been extracted, and which is still hot or at least warm, is preferably recycled as injection water into an injection well also connected to the permeable layer (see FIG. 1).

A prior art set-up by which geothermal fluid is extracted and re-injected is schematically illustrated in FIG. 1. Numeral 10 designates the ground level. Numeral 11 designates an injection well, vertical in this example, sometimes provided with an injection pump 12 by means of which water is injected into the well. Numeral 18 designates a permeable layer which is crossed by the injection well 11. The injection well is perforated at 14 to discharge the injected water into geothermal reservoir 13. The arrows 15 symbolic indicate the flow of geothermal fluid to a production well 16, from which the geothermal fluid exits as symbolically indicated by arrow 17. Alternatively, the above-mentioned wells can slightly deviate from the vertical, its location and orientation being determined by a natural fault or fractures (Albright and Dreesen, 1998).

Other geothermal energy resources are offered by the Xerolithic systems. (See for instance Nunz, 1993). In such resources the underlying rock does not spontaneously produce fluids at an adequate rate and at a useful temperature and it is necessary to artificially create or increase the permeability of the rock and to introduce therein heat transfer fluids. Such systems are called Hot Dry Rock (HDR) or Hot Fractured Rocks (HFR). Rather than exploiting geothermal resources which contain heat mainly in the rocks or contain relatively small amounts of geothermal fluid, and have low permeability, techniques were developed to induce fractures between the production and injection wells to allow larger contact area between the hot rocks and the geothermal fluid while reducing the resistance to flow (Salazar and Brown, 1995). FIG. 2 schematically Illustrates such a prior art set-up. The ground is indicated once again at 10, an injection well is indicated at 21 and is provided with a pump 22. Artificial fractures 28 have been created in the ground and connect injection well 21 with two production well 24. The wells are perforated as at 25 in correspondence to fracture 23.

In such prior art Hot Dry Rock (HDR)/Hot Fractured Rocks (HFR) set-ups the production of geothermal fluids is limited by the permeability of the layers and by their thickness, and in case of fractures by the width of the fractures. The injection pumps require energy to be operated and the amount of energy consumed depends on the permeability of the layer between the injection and the production wells, and in some cases becomes a prohibitive fraction of the energy produced. Other problems are created by the large losses of injected fluid and by the difficulty of producing fractures in the desired direction. Mainly for these reasons the results of the prior art Hot Dry Rock (HDR)/HFR have been disappointing, to the extent that no power plant exploiting them has been built so far, and their only use today is for limited experimental heat extraction.

It is apparent, in the inventor's opinion that the critical stage in the exploitation of low permeability/low water content reservoirs is the flow of geothermal fluid from injection wells to production wells. This invention particularly intends to improve said flow while reducing fluid losses and thereby the whole technology of the use of geothermal fluid for the production of energy in such reservoirs otherwise useless.

It is therefore a purpose of this invention to overcome, at least substantially, the drawbacks of the prior art in the stage of producing hot geothermal fluid from such geological formations.

It is another purpose of this invention to provide a new and improved method and apparatus for permitting to use the heat of geothermal fluids for the production of energy.

It is a further purpose of this invention to enhance the efficient flow of geothermal fluids from injection wells to production wells.

It is a still further purpose of this invention to apply the technology of generating horizontal wells for improving the flow of geothermal fluids from injection wells to production wells.

Other purposes and advantages of the invention will appear as the description proceeds.

SUMMARY OF THE INVENTION

The method of the invention comprises enhancing the flow of geothermal fluid (water and/or steam and/or mixtures thereof) from at least one injection well to at least one production well, by the following steps:
 a. Providing a first, horizontal, geothermal well, which is used as said injection well;
 b. Injecting water into said injection well;
 c. Providing a second, horizontal geothermal well, which is used as said production well such that said second, horizontal, production, geothermal well is substantially horizontally and vertically spaced from said first, horizontal, injection, geothermal well and located at a shallower depth than said first, horizontal, injection, geothermal well;
 d. Recovering geothermal fluid from said production well; and
 e. Generating a water density difference and a pressure difference between said first horizontal injection well and said second horizontal, production well.

Furthermore, the invention comprises an apparatus for enhancing the flow of geothermal fluid (water and/or steam and/or mixtures thereof) from at least one injection well to at least one production well, which comprises:
 I. A first horizontal geothermal well, which is used as said injection well and into which water is injected;
 II. A second horizontal, geothermal well, which is used as said production well and from which geothermal fluid issues, wherein said second, horizontal production, geothermal well is substantially horizontally and vertically spaced from said first, horizontal, injection, geothermal well and located at a shallower depth than said first, horizontal, injection, geothermal well; and
 III. Means for producing a pressure difference between said first horizontal, injection well and said second horizontal, production well and utilizing the water density difference induced by the temperature difference.

Preferably, binary geothermal power plants or combined cycle geothermal power plants can be used to produce power from geothermal fluid recovered from the production well.

The said first horizontal well can also be called "horizontal injection well", and the said second horizontal well can also be called "horizontal production well".

Said first horizontal, deeper, injection well has an inlet, into which injected water enters and thereafter flows out into the geological layer in which the well has been drilled and said second horizontal, shallower, production well has an open outlet, whereby the heated geothermal fluid exits because of the aforesaid pressure difference and buoyancy.

An outline of geothermal drilling is presented in DiPippo, R. et al., Brown University, U.S.A., DOE March 1980, Chapter 2 Section 2.4 of pp. 136-155. Altseimer, 1975). Many of the techniques are derived from oil and gas industry.

In a technique used today in the heavy oil industry, called Steam Assisted Gravity Drainage (SAGD), two horizontal well are drilled parallel to each other in a bitumen layer fund 300-600 ft underground. Steam is injected into the bitumen deposit from the upper well where it condenses and heats the oil. The oil then moves gradually into the lower well where it is collected and delivered to the surface under the pressure produced in the reservoir by the injected steam.

"Cluster" drilling (of two or more directional wells originating from a single initial well) has been described as a productivity enhancer for geothermal applications (D. W. Daering, January 1980).

The proposed horizontal wells of the present invention will be drilled by applying a technology which has been developed by the oil and gas industry.

By providing the horizontal production well at a shallower depth level than the horizontal injection well, in accordance with the present invention, the horizontal production well collects water that has flown out of the deeper horizontal injection well. Water flowing out of said horizontal injection well is heated by earth near this well and thus gains beat. This heated water is thus now hotter than water still present in the horizontal injection well and therefore gains a lower density achieving what may be termed "buoyancy". The pressure has an inherent, static component, due to the said difference of level or depth, and a controllable dynamic component, due to the pressure of the pump that drives the water into said horizontal injection well. Furthermore, a pump associated the horizontal production well maintains a water pressure in the shallower horizontal production well at a value lower than the pressure in the deeper horizontal injection well. Consequently, the heated water will preferably flow upwards in a generally vertical direction towards the horizontal production well rather than in another direction and thereby reducing water losses.

The invention preferably comprises providing the aforesaid horizontal wells by drilling along a geological layer rather than crossing it. This permits to increase the area of heat transfer from the ground to the geothermal fluid and to increase the flow at the cross-section between the horizontal injection and horizontal production wells, both factors leading to an increase of the efficiency of the exploitation of the geothermal energy. In the case of artificial fracturing of the layer, cracks being mostly vertical (Gringarten et al. 1975), will be intersected by the proposed horizontal wells, which further will enhance the productivity at the shallower well upwards.

The pressure and density differences, that are generated according to the invention between the deeper (injection) horizontal, geothermal well and the shallower (production) horizontal, geothermal well, cause the flow of geothermal fluid between them. In such a manner, the water exiting the horizontal injection well (or wells) while becoming less dense as it crosses the above-mentioned existing or artificially created fractured layer is also heated on its way to the horizontal production well. In the case of a semi-permeable layer, this configuration augments the contact area of the infected fluid with the layer separating the above-mentioned wells, and thus partially compensates for the relatively low permeability.

BRIEF DESCRIPTION OF THE DRAWINGS

A description of the present inventive subject matter including embodiments thereof is presented and with reference to the accompanying drawings, the description not meaning to be considered limiting in any manner, wherein:

FIGS. 7 and 8 show predictions of the temperature and production flow rate using a mathematical model of two wells 6.5 MW of Net electrical power.

Similar reference numerals and designations in the various Figs. refer to like elements.

DETAILED DESCRIPTION OF PREFERRED EMBODIMENTS

Figure 1:
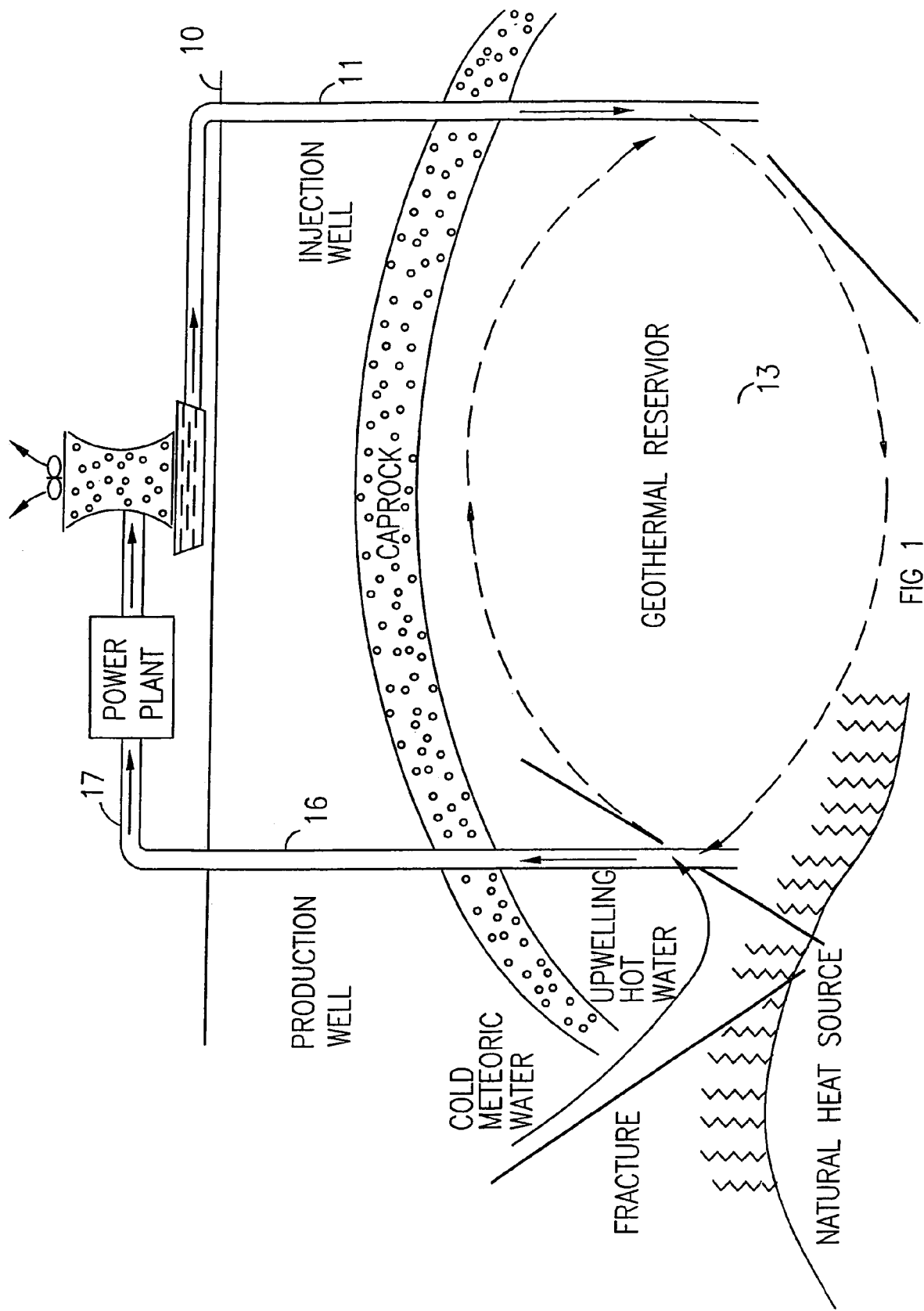
FIGS. 1 and 2 schematically illustrate two examples of the prior art.
Figure 2:
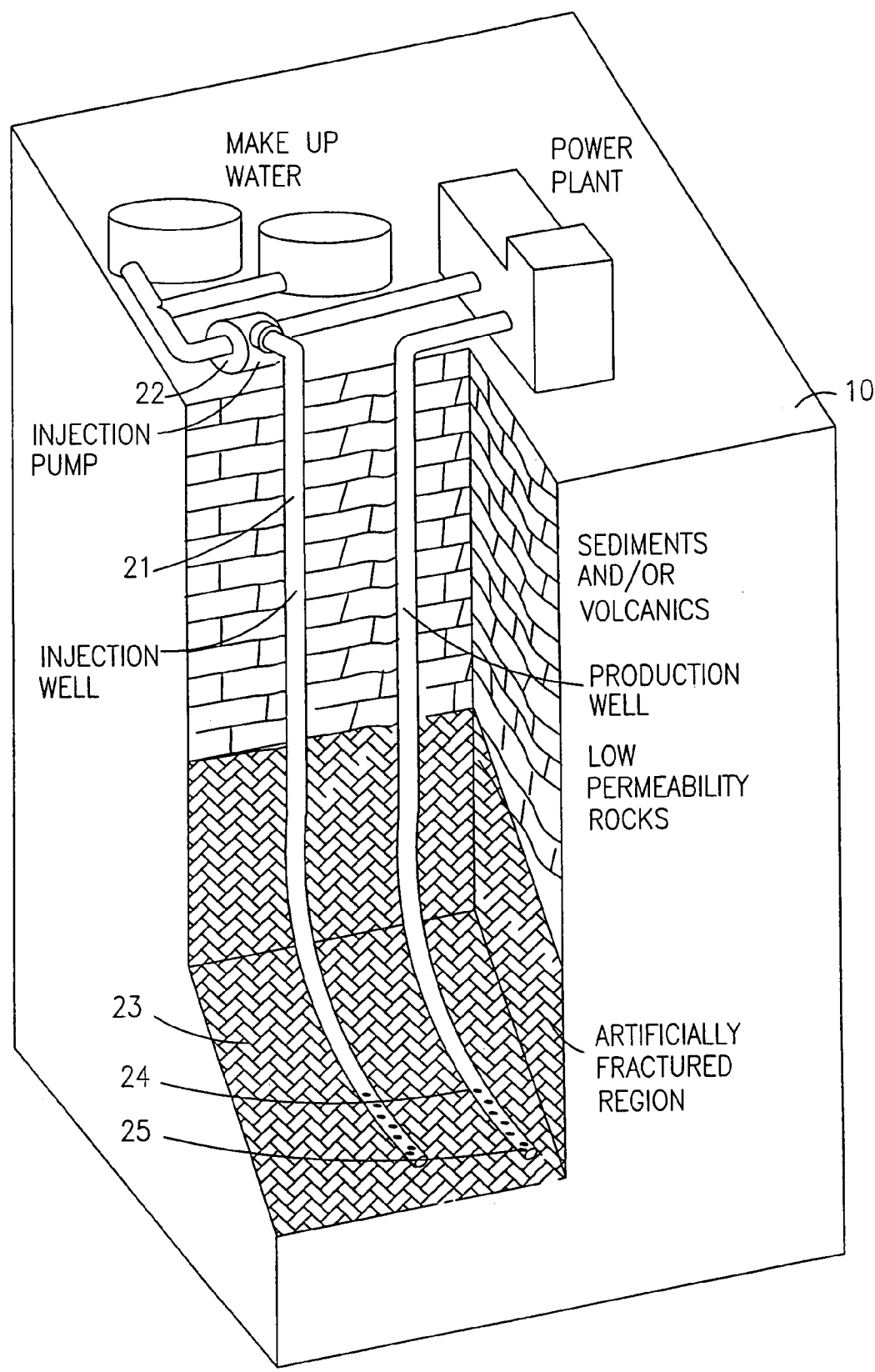
Figure 3:
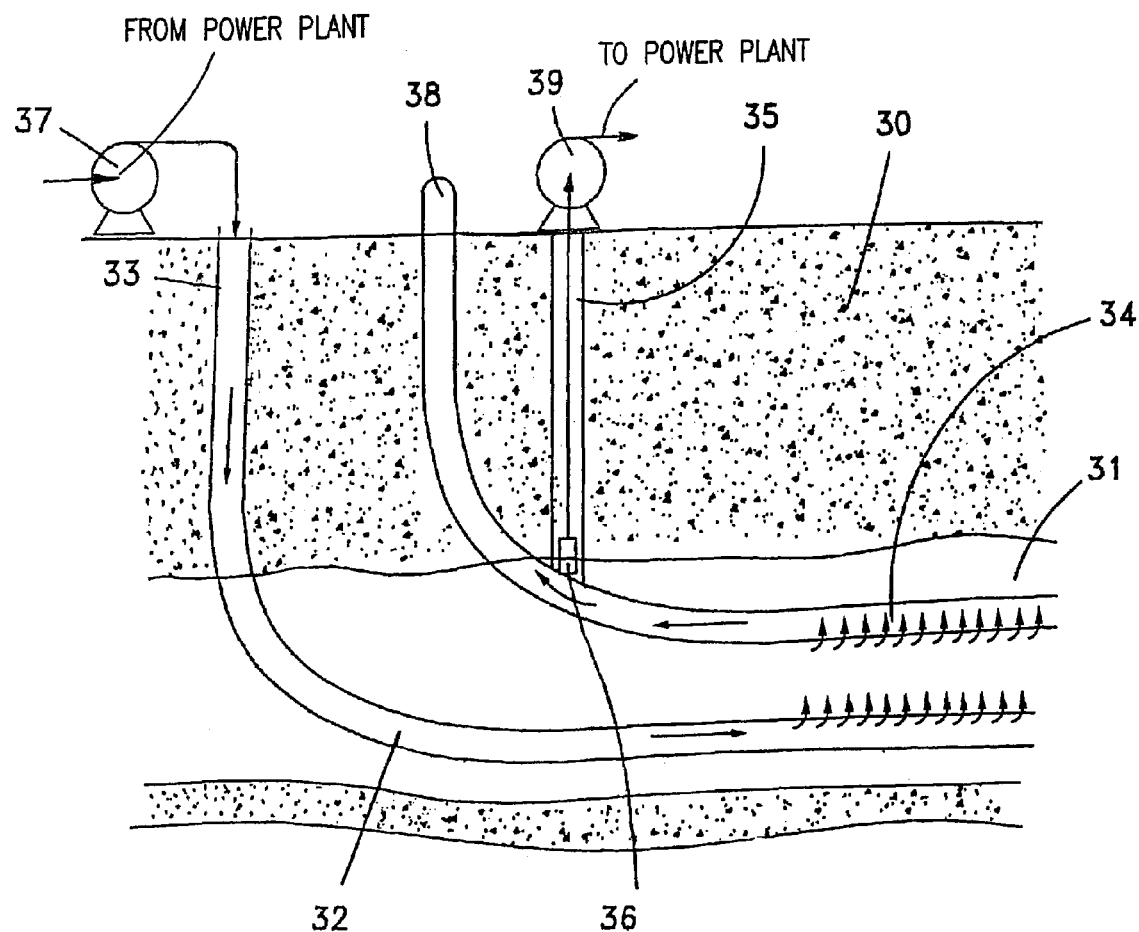
FIG. 3 is a schematic vertical cross section of the ground, illustrating an embodiment of the apparatus of the invention.

In the embodiment of FIG. 8, considered at present the best mode for carrying out the present invention, numeral 30 indicates the ground. Numeral 31 indicates a geological layer that is suitable for the drilling of horizontal wells. Numeral 32 indicates a first (injection) horizontal, geothermal well connected to an injection connection means 33. Numeral 34 indicates a second (production) horizontal, geothermal well connected to production connection means 35. The said two horizontal wells are located in a suitable geological layer 31, first (injection) horizontal, geothermal well 32 being located at a deeper level than shallower, second (production) horizontal geothermal well 34. The suitability of geological layer 31 for such operations and the relative position of said horizontal, geothermal wells are determined by carrying out geophysical surveys and drilling e.g. narrow "slim holes" in said geological layer. Actual core samples or geological cuttings produced from said geological layer 31 are used to complement the findings of the geophysical surveys. The apparatus further includes deep water pump 86 located at the bottom of production connection means 35 adjacent to horizontal production well 34 for extracting hot water from second (production) horizontal, geothermal well 34 and conveying it to a heat consumer. At the heat consumer heat is extracted thereby producing heat-depleted hot water. The heat consumer is particularly a power plant, but other heat consumers are not excluded. Moreover, the apparatus of FIG. 3 also includes water injection pump 37 for supplying the heat-depleted hot water to first (injection) horizontal geothermal well 32 via injection connection means 33. Furthermore, the apparatus of this embodiment of the invention preferably includes observation and instrumentation well 38 for observing temperatures and pressures of the geothermal water. In a non-limiting example, the length of both horizontal geothermal wells 32 and 34 is preferably up to 1 mile within geological layer 31. On the other hand, the vertical distance between first (injection) horizontal, geothermal well 32 and second (production) horizontal geothermal well 34 depends on the structure of the geological layer 31 and on the vertical temperature profile within the geological layer. The two wells are offset horizontally up to 300 ft so that the intersected layer is sufficiently large to enable "harvesting" of a sufficient amount in heat. Usually, however, the vertical distance between the two horizontal wells will be about two orders of magnitude lower than the horizontal length of the geological layer or wells mentioned above. In such a manner, the horizontal extent of geological layer can be exploited wherein the horizontal distance between the injection, deeper horizontal wells and the production, shallower horizontal well can be made large enough even though the vertical distance between the horizontal injection and horizontal production wells is relatively small.

In accordance with the present invention, the water and make-up water used can be supplied from an external source. Alternatively, part of the water circulating comes from the reservoir while only the make-up water is from an external source.

Figure 3A:
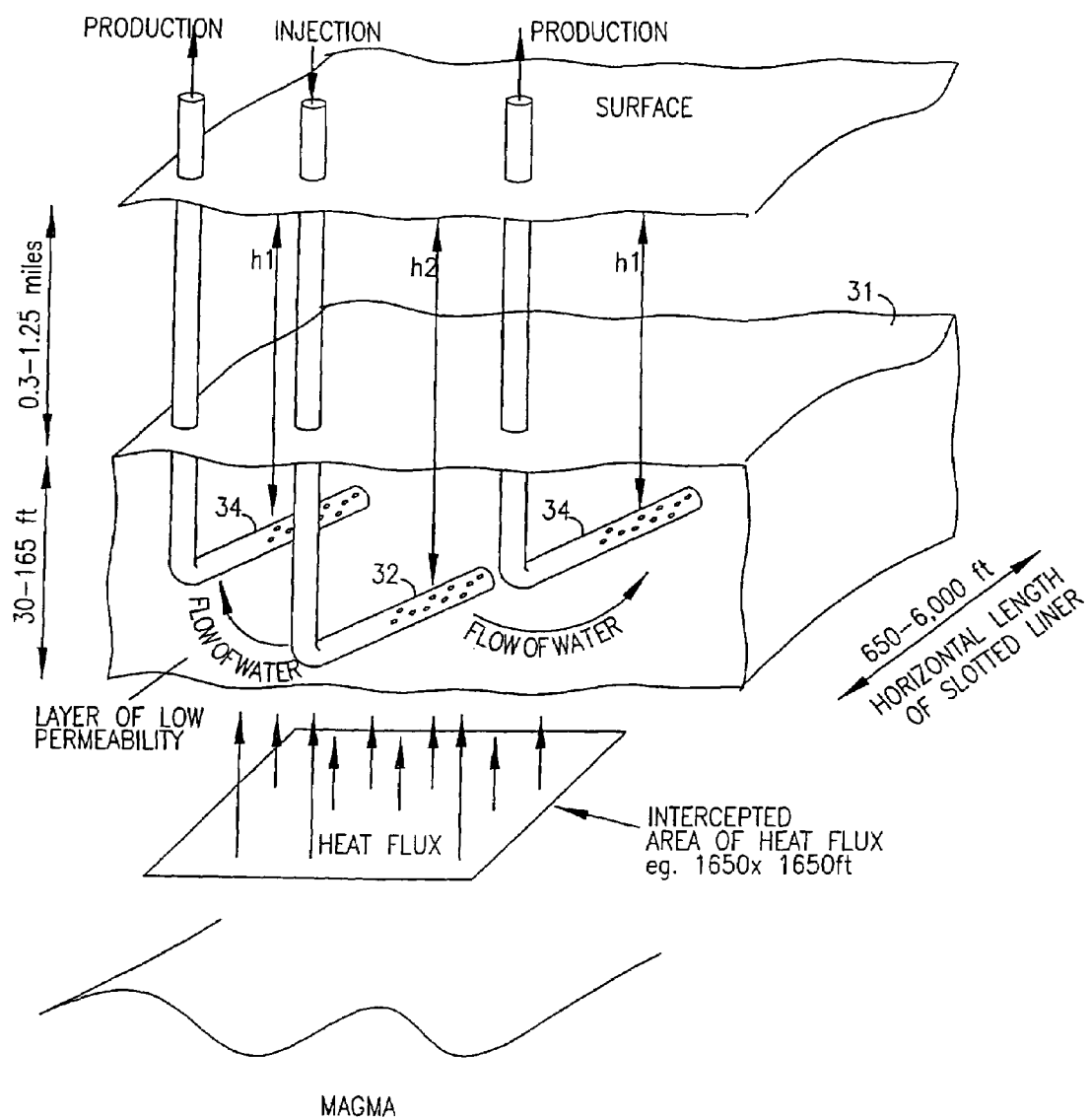
FIG. 3A is a further schematic view of the ground, also illustrating an embodiment of the apparatus of the invention.

A further view of an embodiment of the present invention is shown in FIG. 3A wherein non-limiting examples of dimensions of the horizontal wells 32 and 34 as well as of the dimensions of geological layer 31 and of the depth of geological layer 31 of the ground surface are given. In addition, a non-limiting example of dimensions of the intercepted area of the geothermal heat flux for the present invention is also shown.

Figure 4:
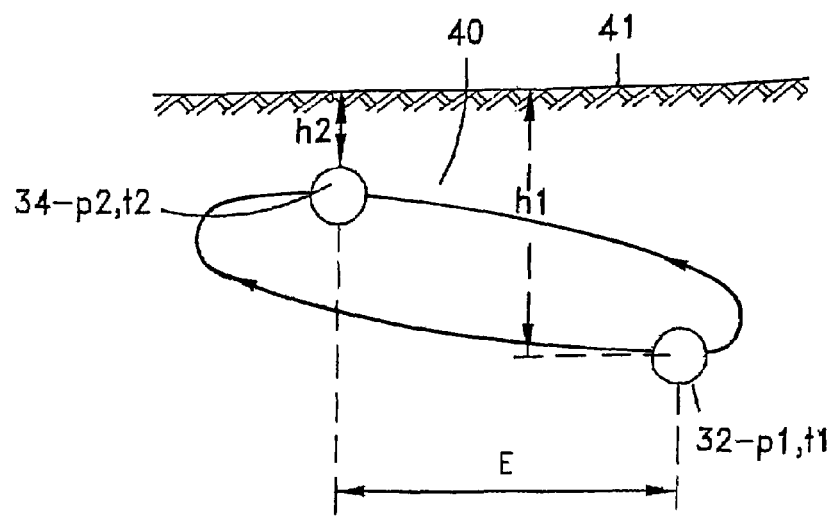
FIG. 4 is a schematic illustration of the flow lines of water and geothermal fluid in an embodiment of the invention.

In FIG. 4, to which reference is now made, flow lines 40 are shown to illustrate the general flow path of the geothermal water in the earth of geological layer 31 from first, deeper (injection) horizontal, geothermal well 32 to second, shallower (production) horizontal, geothermal well 34. $p_1$ designates the hydrostatic pressure of geothermal water present in horizontal (injection), geothermal well 32 at a depth $h_1$ from ground surface 41, while $t_1$ designates the temperature of this geothermal water in this injection well. On the other hand, $p_2$ designates the hydrostatic pressure of geothermal water present in second (production) horizontal, geothermal well 34 at a depth $h_3$ from ground surface 41, while $t_2$ designates the temperature of this geothermal water. Water in first (injection) horizontal well 32 is pressed by injection pump 37 as well as hydrostatic pressure head $p_1$, while deep well pump 86 is used to produce a lower pressure in second (production) horizontal well 34. The heat difference in geothermal geological layer 31, whereby the water flowing out of the first (injection) horizontal well 32 into the hot earth in the vicinity of the injection well present in the existing or artificially created by fracture permeable layer in the geological layer causes this water to be heated and therefore have a lower density that the water flowing in the first (injection) horizontal well 32, assists in raising the water from the first injection horizontal well to the second production horizontal well. Consequently, in FIG. 4 ($p_1-p_2$) represents the hydrostatic pressure difference between the first (injection) horizontal geothermal well 32 and the second (production) horizontal, geothermal well 34 over the depth difference ($h_3-h1$), while ($t_3-t_1$) represents the temperature difference between said fist (injection) horizontal, geothermal well 32 and said second (production) horizontal, geothermal well 34 over the depth difference ($h_2-h_1$). The pressure difference is increased by pressurizing the deeper injection well by means of pump 37 (see FIG. 3), above the hydrostatic pressure existing in the layer 31 at the depth of horizontal injection well 32 and reducing the pressure in the production well below the hydrostatic pressure existing in the layer 31 at the depth of shallower horizontal production well 34 by means of pump 36 (see FIG. 3). A density difference favorable for the "buoyancy" is achieved by situating the second (production) horizontal, geothermal well 34 above and the first (injection) horizontal geothermal well 32.

Figure 5:
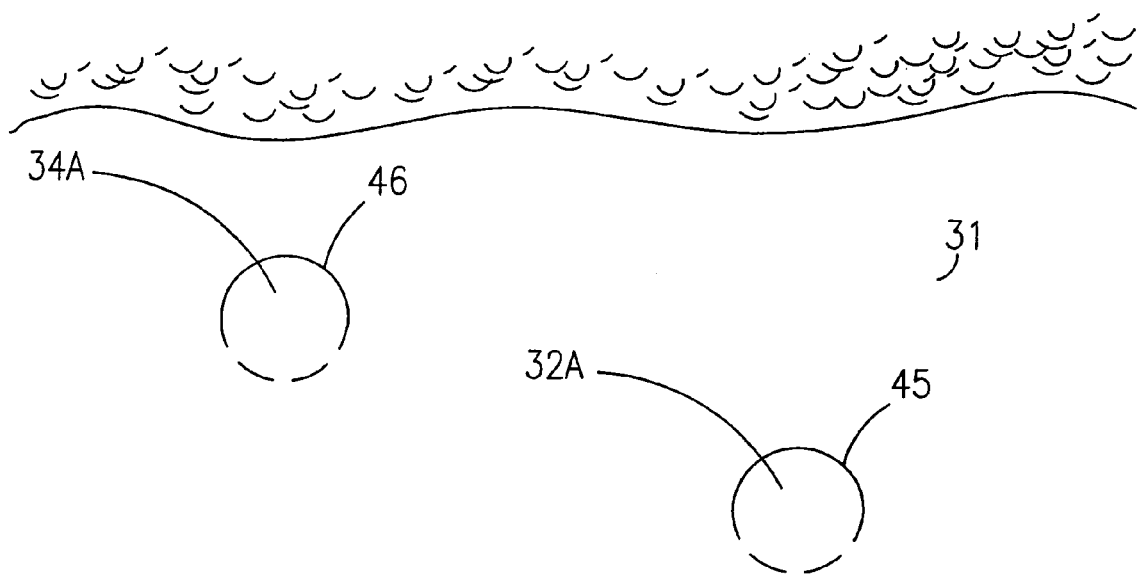
FIG. 5 is a schematic cross section of the injection and production wells, showing the perforations therein according to an embodiment of the invention.

In FIG. 5 a further embodiment of the present invention is shown, wherein perforated pipes are used in first (injection), deeper horizontal well 32 and second (production), shallower horizontal well 34 in order to increase the flow path from the first of said wells to the second. Preferably, as shown, perforated, first (injection), deeper horizontal pipe 32A has perforations 45 on the lower side only. As far as second (production), perforated, shallower horizontal pipe 34A is concerned, perforations 46 are also present on its lower side. In addition, by positioning the perforations as previously described, clogging of the perforations is reduced or substantially avoided.

Figure 6:
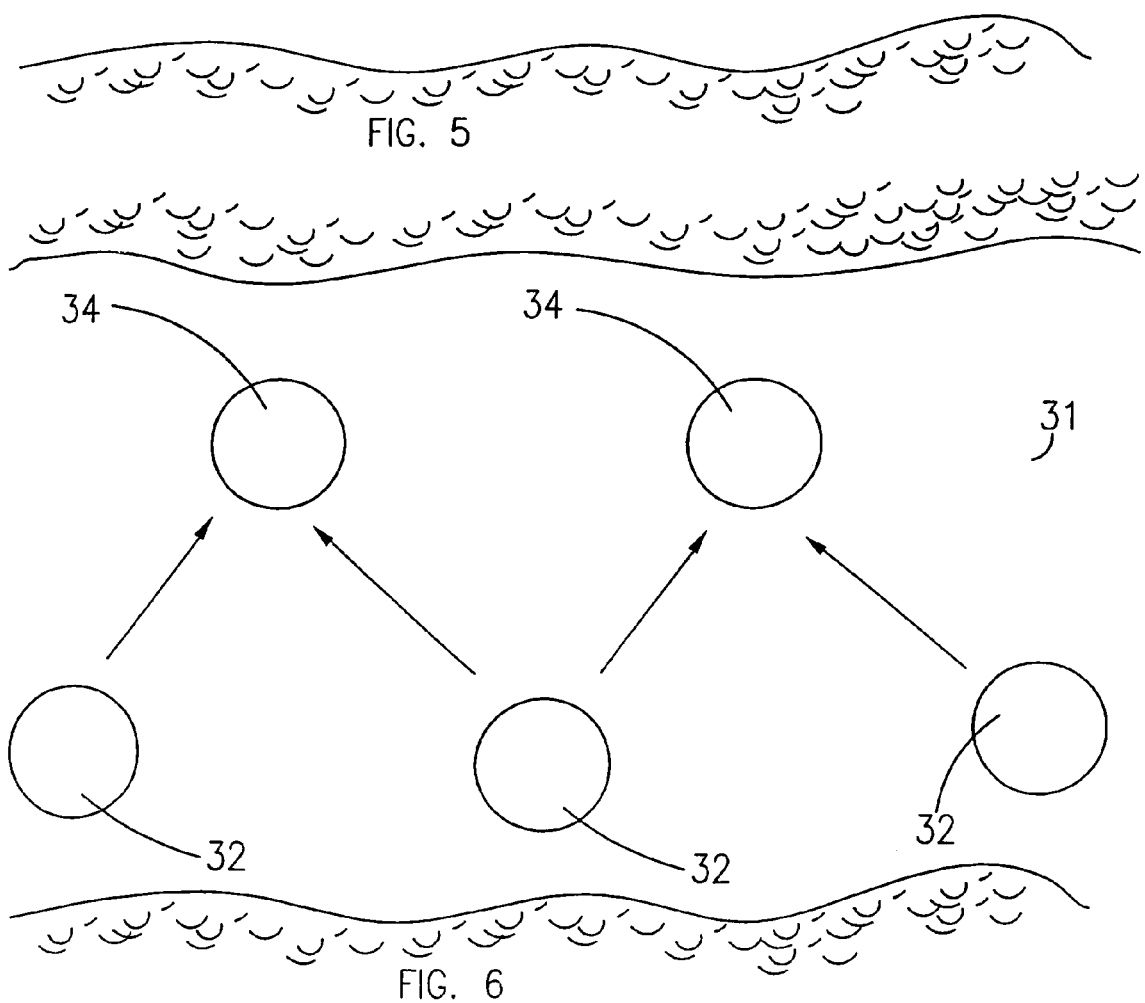
FIG. 6 is a schematic illustration or cross-section of another embodiment of the invention.
Figure 9A:
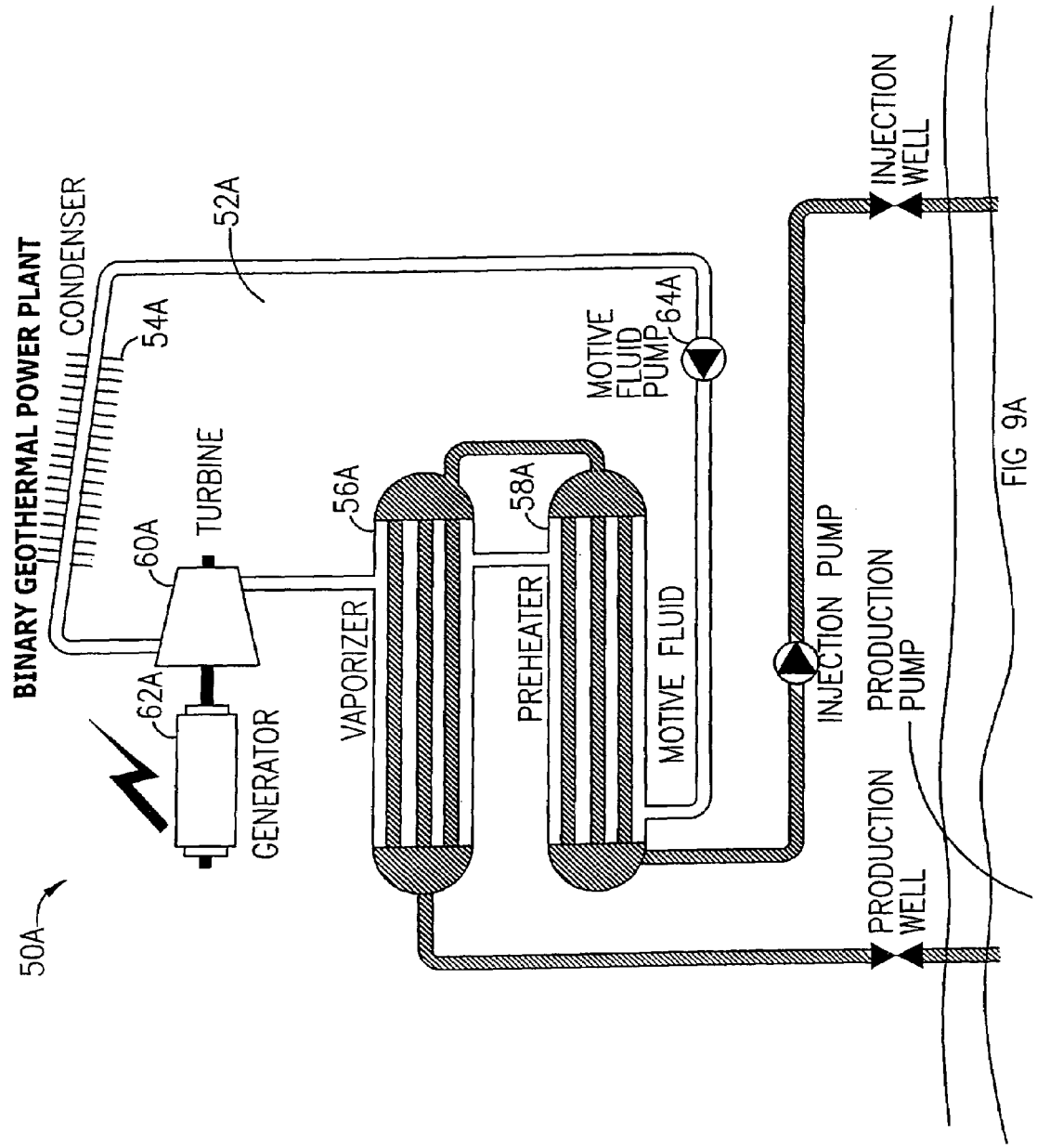
FIGS. 9A, 9B, 9C and 10, show further embodiments of the present invention including different power plant configurations.
Figure 9B:
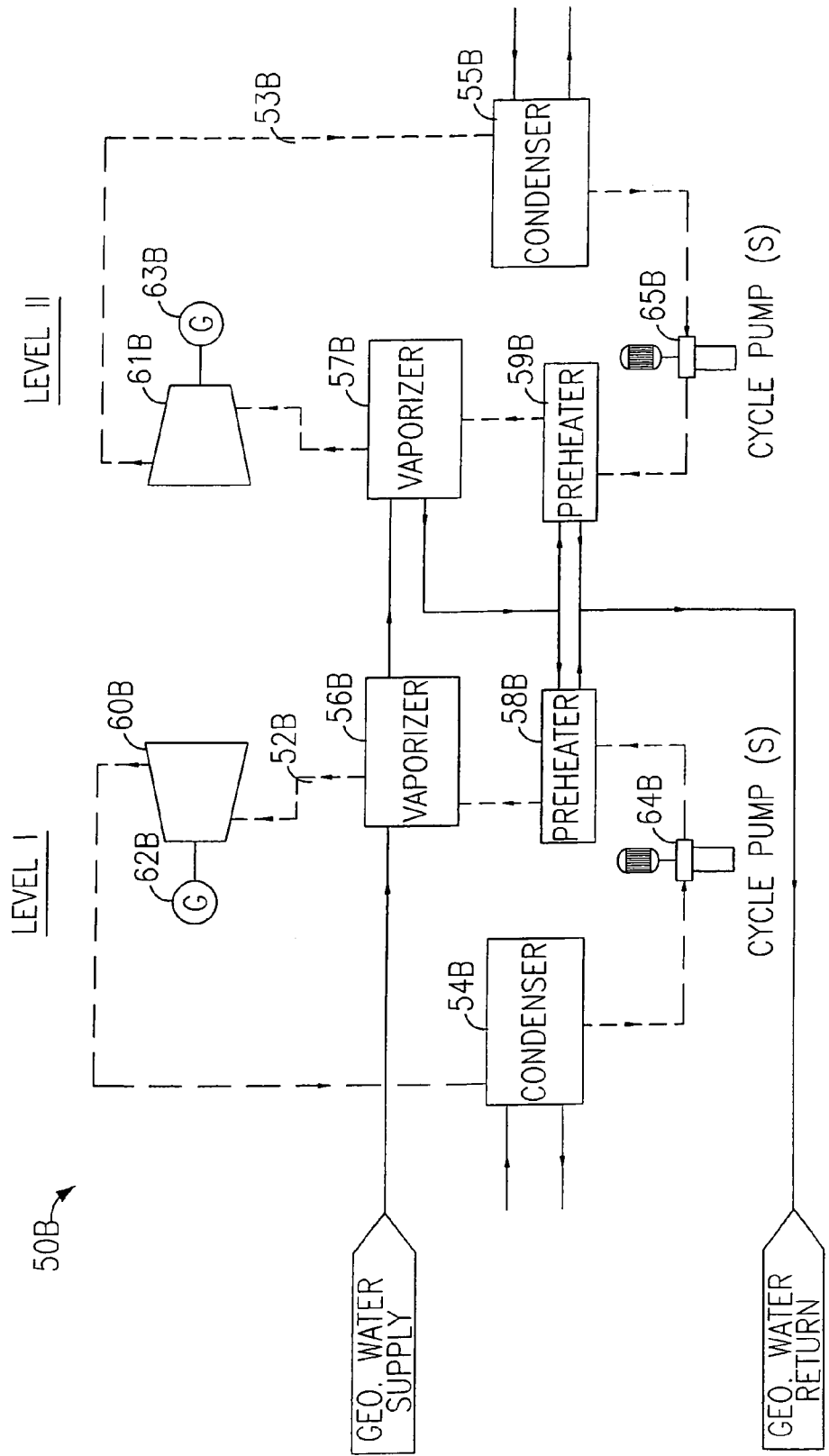
Figure 9C:
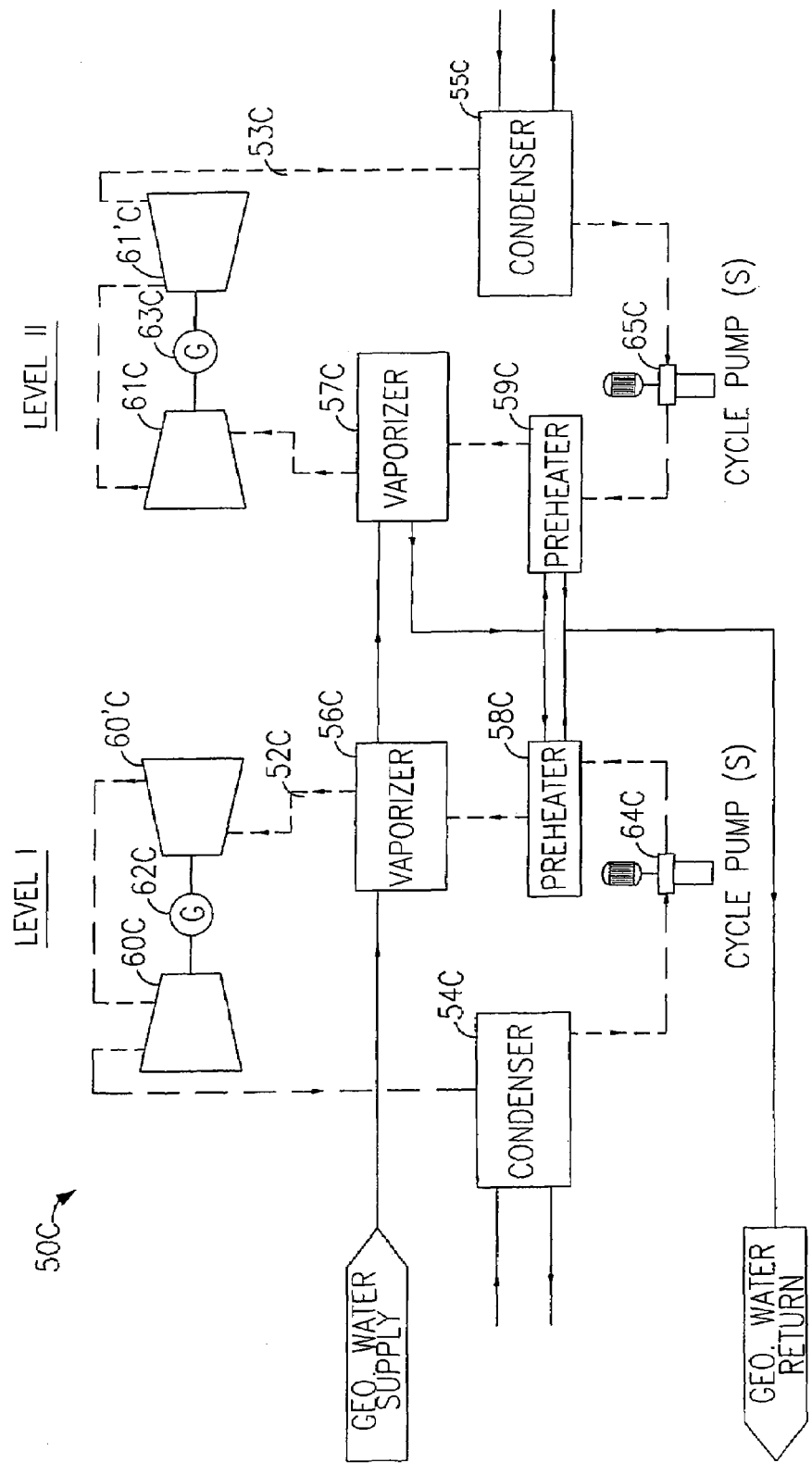
Figure 10:
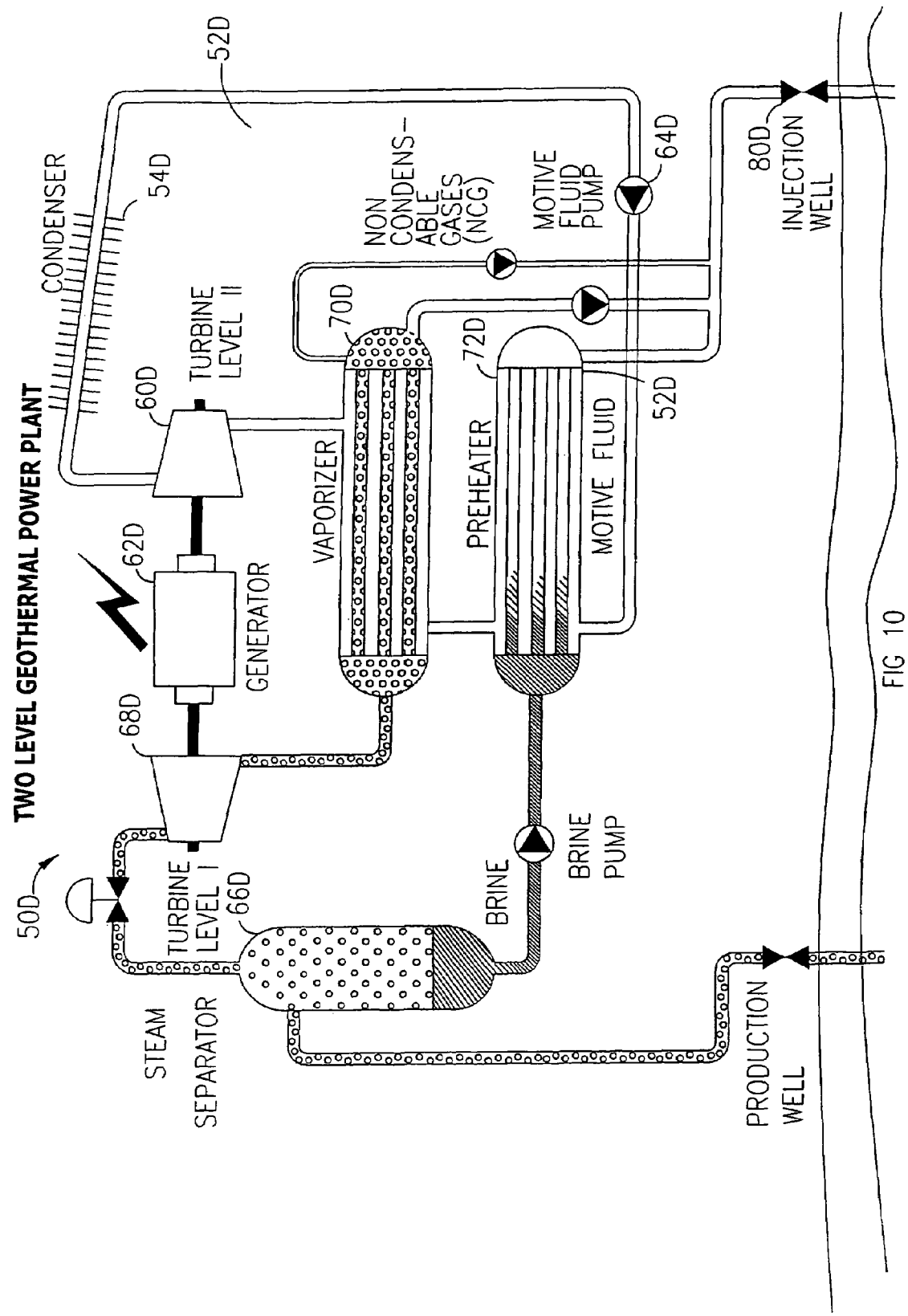

In accordance with embodiments of the present invention, and as shown in FIG. 6 a number of horizontal wells 34 (only two are shown in FIG. 6, but this involves no limitation) can be positioned in layer 31. Furthermore, several first (injection) horizontal wells can be used for one second (production) horizontal well. In such a manner, the horizontal extent of geological layer can be further exploited wherein the horizontal distance between the injection, deeper horizontal wells and the production, shallower horizontal well can be made large enough even though the vertical distance between the horizontal injection and horizontal production wells is relatively small. In a non-limiting example, the horizontal distance between the injection, deeper horizontal wells and the production, shallower horizontal well can be approximately 1000 to 2000 ft while the vertical distance between the horizontal injection and horizontal production wells is approximately 50 to 150 ft.

In this description, reference has always been made to the use of the geothermal heat for the production of energy, particularly electrical energy. It will be understood that said heat, or a part of it, may be used for other purposes, particularly may be used directly as such, and that the way in which it is used is not an important condition of the present invention.

An illustrative example is given below using a mathematical model of a low permeability geological layer which would be impossible to exploit by conventional methods. For simplicity only "heat mining" is considered by neglecting the heat flux from the magma.

Here a plot shows the output for the proposed horizontal well heat mining operation assuming a 500 foot tick homogeneous reservoir with a transmissivity of 7500 millidarcy-ft (md-ft), initially 400° F., and an initial reservoir pressure of 1000 psia. The permeability in this model (7,500 millidarcy (md)) would yield a productivity index of approximately 0.7 kilopounds per hour/pounds per square inch (kph/psi) for a vertical well, and approximately 2.8 kph/psi for a horizontal well.

Transmissivity which is in essence the ability of a media to transmit a substance (water) from one location to another is calculated as Permeability multiplied by Thickness.

Permeability which is the media (i.e. rock, sand) parameter (similar to thermal conductivity) is noted as k and measured in Darcy.

The thickness h is measured in feet.

The injection temperature is 160 deg. F.

Vertical permeabilities and horizontal permeabilities are assumed equal. The production wells were placed in the upper ⅓ of the reservoir's thickness, and the injection wells were placed in the lower ⅓ of the reservoir's thickness. No "recharge" influx was allowed from any of the boundaries. This is probably similar to what would occur in the interior patterns. Edge wells may interact more with "recharge". No recharge in this modeling was assumed in order to look purely at a heat mining process. The horizontal wells were placed with 2000 foot horizontal sections into this 500 foot thick reservoir.

Injection wells and production wells an spaced 2000 feet apart in the horizontal direction. It was assumed that injection was equal to production. The maximum allowed drawdown for the production wells was set to 400 psi, and the maximum flow rate was set to 800 kph.

The simulation was run as described above. For the first 10 years, there is enough submergence at the production well to allow full pump capacity of 800 kph. However, because the injected fluid is cooler than the produced fluid, volume replacement is less than one (shrinkage), causing a steady decline in reservoir pressure. After 10 years, the minimum allowable downhole pressure is reached in the production well, and flow rate needs to be gradually curtailed.

This shows that the use of horizontal wells could allow for enhanced well productivities for reservoirs containing low permeability. For a 500 foot thick homogeneous layer with 2000 foot well spacing, there appears to be enough heat in the rock to make such a heat mining operation possible (over a 20 year time frame).

800 kp/h at 400 deg F. will generate 7.5 MW net from the power plant (based exactly on a standard binary plant design) but we should deduct 1 MW for pressure losses, which are 1000 psi in the formation and probably 100 more in the wells and power plant, so 6.5 MW will then conservatively estimated power generated over 10 to 20 years (See FIGS. 7 and 8).

Turning to FIGS. 9A, 9B, 9C and 10, power plants are shown designated as 50A, 50B, 50C and 50D respectively showing the method of producing power using the apparatus of the present invention. As can be seen from the FIGS., binary geothermal power plants in closed cycle power units 52A, 52B, 52C (split turbine: high pressure and low pressure), or in combined cycle power geothermal plants 52D are used in the power plants. In most cases, an organic fluid, such as pentane, or butane, etc., is considered for use as the working fluid in the binary power plants. However, if the temperature is high enough to have steam (flashed in the reservoir or a flash tank), water can be used as the working fluid in the power plant so that a steam turbine will form the topping part of the power plant cycle while the organ turbine will form the bottoming part of the power plant cycle. Such a plant may be called a combined cycle or hybrid geothermal plant, designated 50D. Condensers 54A, 54B, 55B, 54C, 55C, and 54D are preferably air-cooled. In these binary power units heat is extracted from geothermal fluid in vaporizer 56A and pre-heater 58A so that the working fluid is heated and organic working fluid vapors are produced in the vaporizer that are supplied to organic vapor turbine 60A. Organic vapor turbine 60A is rotated by the expanding vapors and drives electric generator 62A for producing electric power. The expanded vapors exiting vapor turbine 60A are then supplied to condenser 54A where they are condensed and the condensate produced are supplied by cycle pump 64A via pre-heated 58A back to vaporizer 56A thus completing the organic Rankine cycle. Similar operation takes place in two level geothermal water or brine binary geothermal power plants 50B and 50C (see FIGS. 9B and 9C) however in these two level geothermal water or brine binary geothermal power plants, hot geothermal fluid in the form of geothermal water or brine is supplied in series to vaporizers 56B, 57B and 56C and 57C, with the heat depleted geothermal fluid in the form of heat depleted geothermal water of brine exiting the vaporizers being supplied in parallel to pre-heaters 58B, 59B and 58C and 59C respectively. In U.S. Pat. Nos. 4,578,953, 4,700,543 and 5,581,073 similar power plants and methods for producing power are disclosed and the disclosures of these patents are hereby incorporated by reference. In combined cycle geothermal power plant 50D, hot geothermal fluid supplied from the production well is separated into geothermal steam and geothermal liquid, water or brine by separator 66D. The separated geothermal steam is then supplied from separator 66D to steam turbine 68D where it expands and rotates the steam turbine so that electric generator 62D is driven by steam turbine 68D and produces electricity. The expanded steam exiting steam turbine 68D is supplied to vaporizer 70D where it condenses and vaporizes the organic working fluid. The vaporized organic working fluid is then supplied to organic vapor turbine 60D where it expands and the vapor turbine rotated thereby drives electric generator 62D for producing electric power. Expanded working fluid exiting vapor turbine 60D is supplied to condenser 54D, where it is condensed and the condensate produced is supplied by cycle pump 64D via pre-heater 72D back to vaporizer 70D thus completing the cycle. Heat contained in geothermal water or brine separated from geothermal fluid in separator 66D and supplied from separator 66D to preheater 72D pre-heats the liquid organic working fluid in the pre-heater and the pre-heated working fluid is supplied to vaporizer 70D. Thereafter, heat depleted water or brine is supplied from pre-heater 72D to injection well 80D together with steam condensate exiting vaporizer 70D and non-condensable gases also exiting the vaporizer.

The advantages and improved results furnished by the method and apparatus of the present invention are apparent from the foregoing description of preferred embodiments of the invention. Various changes and modifications may be made without departing from the spirit of the invention and without exceeding the scope of the claims.

The invention claimed is:

1. Method for recovering geothermal heat, which comprises enhancing the flow of geothermal fluid from at least one injection well to at least one production well, by the following steps:
   a. Providing a first, horizontal, geothermal well in the ground at a geological layer having an elevated temperature, which is used as said injection well;
   b. Injecting water into said injection well, whereby the injected water is heated;
   c. Providing a second, horizontal, geothermal well in the ground, which is used as said production well, such that said second, horizontal, production, geothermal well is substantially horizontally and vertically spaced from said first, horizontal, injection, geothermal well by a distance dependent on the elevated temperature and located at a shallower depth than said first, horizontal, injection, geothermal well;
   d. Recovering geothermal fluid from said production well;
   e. Generating a water density difference and a pressure difference between said first horizontal, injection well and said second horizontal, production well; and
   f. Inducing geothermal fluid into said second horizontal geothermal well from the geological layer because of buoyancy of the water and the pressure difference between the horizontal injection and horizontal production wells.

2. Method according to claim 1, wherein the horizontal wells are provided by drilling along a geological layer.

3. Method according to claim 1, comprising increasing the pressure difference by pressurizing the water, injected in the horizontal, deeper injection well, above the hydrostatic pressure existing at the depth of the horizontal deeper injection geothermal well, and reducing the pressure in the horizontal, shallower production well using a fluid pump connected to said horizontal production well.

4. Method according to claim 1, further comprising extracting heat from the geothermal fluid recovered from the production well and using said heat for the production of energy.

5. Method according to claim 1, wherein the water injected into the injection well is the geothermal fluid, recovered from the production well, depleted of heat by heat exchange.

6. Method according to claim 1, further comprising monitoring the pressure difference.

7. Method according to claim 1, wherein the first and second horizontal, geothermal wells are formed in a geological layer the suitability of which has been determined.

8. Method according to claim 3, wherein the suitability of the geological layer is determined by geophysical surveys and by drilling slim holes in said layer.

9. Apparatus for enhancing the flow of geothermal fluid from at least one injection well to at least one production well, which comprises:
   a. A first, horizontal geothermal well, which is used as said injection well into which water is injected,
   b. A second horizontal, geothermal well, which is used as said production well from which geothermal fluid issues, wherein said second, horizontal, production, geothermal well is substantially horizontally and vertically spaced from said first, horizontal, injection, geothermal well and located at a shallower depth than said first, horizontal, injection, geothermal well; and
   c. Means for producing a water density difference and a pressure difference between said first horizontal, injection well and said second horizontal, production well, wherein the first horizontal, injection geothermal well has an open slotted outlet, from which injected water flows into the geological layer in which the well has been drilled, and the second horizontal, production geothermal well has an open slotted inlet, whereby geothermal fluid flows into it from the geological layer because of buoyancy of the water and the pressure difference between said horizontal injection and horizontal production wells.

10. Apparatus according to claim 9, further comprising instrumentation for monitoring the pressure difference.

11. Apparatus according to claim 9, further comprising an observation well connected to the second horizontal, production geothermal well, and wherein the instrumentation comprising observation instrumentation present in said observation well.

12. Apparatus according to claim 9, wherein the first horizontal, geothermal well has a length up to 1.25 miles.

13. Apparatus according to claim 9, wherein the second horizontal, geothermal well has a length up to 1.25 miles.

14. Apparatus according to claim 9, wherein the horizontal distance between the first horizontal well and the second horizontal well is up to 2000 feet.

15. Apparatus according to claim 9, wherein the vertical distance between the first horizontal well and the second horizontal well is up to 150 feet.

16. Apparatus according to claim 9, further comprising a power plant comprising an electricity generator and at least one turbine for driving said generator, conduit means for conveying geothermal fluid to said power plant whereby said geothermal fluid becoming heat-depleted, and conduit means for conveying heat-depleted geothermal fluid from said power plant to the horizontal, injection well.

17. Apparatus according to claim 9, further comprising a heat exchanger, conduit means for conveying geothermal fluid to a heat exchanger whereby to heat is transferred to a working fluid for producing power in a power plant.

18. Apparatus according to claim 17 including a binary power plant comprising an organic vapor turbine operating according to an organic Rankine cycle.

19. Apparatus according to claim 18 wherein said binary power plant includes an air-cooled condenser.

20. Apparatus according to claim 18 wherein the working fluid of said binary power plant is pentane or isopentane.

21. Apparatus according to claim 18 wherein the working fluid of said binary power plant is butane or isobutane.

22. Apparatus according to claim 17 wherein said power plant is a combined cycle geothermal power plant.

23. Apparatus according to claim 9, further comprising a water injection pump for injecting heat-depleted geothermal fluid into the horizontal, injection well.

24. Apparatus according to claim 9, further comprising a deep well pump connected to the horizontal production well for pumping hot geothermal fluid from the production well.

25. Apparatus according to claim 9, wherein the horizontal, injection geothermal well comprises a perforated horizontal pipe.

26. Apparatus according to claim 9, wherein the second horizontal, production geothermal well comprises a perforated horizontal pipe.

27. Apparatus according to claim 25, wherein the perforated horizontal pipe is perforated on its lower surface.

28. Apparatus according to claim 26, wherein the perforated horizontal pipe is perforated on its lower surface.

29. Apparatus according to claim 9, wherein the production horizontal geothermal well is generally parallel to the injection horizontal, geothermal well.

30. Apparatus according to claim 9, comprising a plurality of injection horizontal, geothermal wells for one production horizontal, geothermal well.

31. Apparatus according to claim 9 comprising a plurality of horizontal injection wells and a plurality of horizontal production wells spaced horizontally and vertically.

32. Apparatus according to claim 9 wherein all the water and make-up water is supplied from an external source.

33. Apparatus according to claim 9 wherein part of the water circulating is from the reservoir and only make-up water is from an external source.

34. Method for assuring the flow of geothermal fluid from at least an injection well to at least a production well, which comprises the following steps:
   I—Providing a first, horizontal, geothermal well, which is connected to said injection well;
   II—Injecting water into said injection well;
   III—Providing a second, horizontal, geothermal well, which is connected to said production well;
   IV—Recovering geothermal fluid from said production well;
   V—Generating a water density difference and a pressure difference between said first horizontal well and said second horizontal well by providing a fluid pump connected to said second horizontal well; and
   VI. Inducing geothermal fluid into said second horizontal geothermal well from the geological layer because of buoyancy of the water and the pressure difference between the horizontal injection and horizontal production wells.

35. Method according to claim 1, wherein the geothermal fluid is one of water, steam and a combination thereof.

36. Apparatus according to claim 9, wherein the geothermal fluid is one of water, steam and a combination thereof.

37. Method according to claim 34, wherein the geothermal fluid is one of water, steam and a combination thereof.

38. Apparatus according to claim 22 wherein said combined cycle geothermal power plant includes a steam turbine for expanding geothermal steam from said geothermal fluid and producing electricity, a vaporizer to which the expanded steam is supplied to condense and vaporize the working fluid, which working fluid is supplied to a turbine where it expands thereby driving an electric generator for producing electric power.

* * * * *

UNITED STATES PATENT AND TRADEMARK OFFICE
CERTIFICATE OF CORRECTION

PATENT NO. : 7,320,221 B2 Page 1 of 1
APPLICATION NO. : 10/910613
DATED : January 22, 2008
INVENTOR(S) : Lucien Y. Bronicki It is certified that error appears in the above-identified patent and that said Letters Patent is hereby corrected as shown below:

Column 2, line 17, delete "beat" and insert --heat--;

Column 4, line 46, delete "beat" and insert --heat--;

Column 5, line 50, delete numeral "8" and insert numeral --3--.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,320,221 B2 | Page 1 of 1 |
| APPLICATION NO. | : 10/910613 | |
| DATED | : January 22, 2008 | |
| INVENTOR(S) | : Lucien Y. Bronicki | |

It is certified that error appears in the above-identified patent and that said Letters Patent is hereby corrected as shown below:

On the Title Page, Item (73)
Please change the Assignee from "ORAMT TECHNOLOGIES, INC." to
--ORMAT TECHNOLOGIES, INC.--

Signed and Sealed this

Thirtieth Day of June, 2009

JOHN DOLL
*Acting Director of the United States Patent and Trademark Office*